(12) United States Patent
Matthews

(10) Patent No.: US 8,400,932 B2
(45) Date of Patent: *Mar. 19, 2013

(54) METHOD OF PROVIDING VOICE OVER IP AT PREDEFINED QOS LEVELS

(75) Inventor: Adrian S Matthews, Bridgewater, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1393 days.

This patent is subject to a terminal disclaimer.

(21) Appl. No.: 11/932,011

(22) Filed: Oct. 31, 2007

(65) Prior Publication Data

US 2009/0109965 A1    Apr. 30, 2009

Related U.S. Application Data

(63) Continuation of application No. 10/262,748, filed on Oct. 2, 2002, now Pat. No. 7,298,736.

(51) Int. Cl.
*H04L 12/56* (2006.01)
(52) U.S. Cl. .......................... 370/252; 370/356
(58) Field of Classification Search ............ None
See application file for complete search history.

(56) References Cited

U.S. PATENT DOCUMENTS

| 6,553,515 | B1 | 4/2003 | Gross et al. |
| 6,735,192 | B1 | 5/2004 | Fried et al. |
| 6,788,651 | B1 | 9/2004 | Brent et al. |
| 7,065,573 | B2* | 6/2006 | Byrnes ......................... 709/224 |
| 7,079,486 | B2 | 7/2006 | Colavito et al. |
| 7,193,992 | B2* | 3/2007 | Hasan Mahmoud et al. . 370/356 |
| 7,245,608 | B2 | 7/2007 | Tseng et al. |
| 7,881,284 | B2* | 2/2011 | Lin et al. ..................... 370/352 |
| 2002/0186681 | A1 | 12/2002 | Martin |
| 2004/0057383 | A1 | 3/2004 | Tseng et al. |
| 2004/0066751 | A1 | 4/2004 | Tseng et al. |
| 2006/0039280 | A1 | 2/2006 | Anandakumar et al. |

* cited by examiner

*Primary Examiner* — Min Jung

(57) ABSTRACT

The present invention is a technique for provisioning and assessment of voice quality in Internet Protocol (IP) voice applications. A predetermined quality of service (QoS) is received from a user in the form of an acceptable packet loss. The technique measures current packet loss and delay in the network and in the terminal, and determines and optimum play-out delay for the use by a play-out adaptation routine. An actual QoS is reported back to the user. To enhance packet delay and loss measurement, a QoS engine component is placed on the terminal side of the packetizer, therefore including packetizer losses in any measurement of the network.

17 Claims, 4 Drawing Sheets

FIG. 5

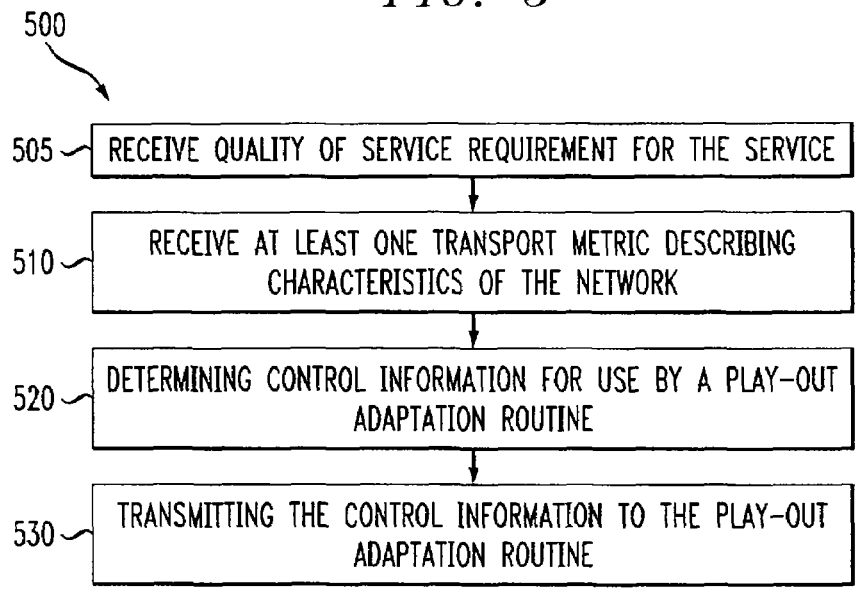

505 — RECEIVE QUALITY OF SERVICE REQUIREMENT FOR THE SERVICE

510 — RECEIVE AT LEAST ONE TRANSPORT METRIC DESCRIBING CHARACTERISTICS OF THE NETWORK

520 — DETERMINING CONTROL INFORMATION FOR USE BY A PLAY-OUT ADAPTATION ROUTINE

530 — TRANSMITTING THE CONTROL INFORMATION TO THE PLAY-OUT ADAPTATION ROUTINE

FIG. 6

R-FACTOR TO MOS MAPPING

| RANGE | MOS |
|---|---|
| R < 0 | 1 |
| 0 < R < 100 | $1+0.035R+(7.0 \times e^{-6})R(R-60)(100-R)$ |
| R > 100 | 4.5 |

FIG. 7

ESTIMATED ENCODING DELAYS (MILLISECONDS)

| CODEC TYPE | ESTIMATED ENCODING DELAY ms |
|---|---|
| G.711 | $10 \times N$ |
| G.729a | $5 + 10 \times N$ |

METHOD OF PROVIDING VOICE OVER IP AT PREDEFINED QOS LEVELS

This application is a continuation of U.S. patent application Ser. No. 10/262,748 filed on Oct. 2, 2002, now U.S. Pat. No. 7,298,736, issued Nov. 20, 2007, which is herein incorporated by reference.

The present invention relates generally to providing telephony and other communications services over a packetized network such as the Internet, and more specifically to a non-invasive, real-time technique for assessing and providing voice quality in Internet Protocol (IP) voice applications.

BACKGROUND OF THE INVENTION

As the use of the Internet increases, there is a concomitant increase in the use of voice-over-IP (VoIP); i.e., the use of the Internet to transmit real-time voice conversations. This is attributed to the convergence of computing and telecommunications under a single umbrella. Given availability of the requisite bandwidth, advanced users opt for the immediacy of packet voice while engaged in an IP data application, as opposed to deriving voice associated with the application either from another medium, or at a later time.

The public Internet is a multi-node matrix of routers and switches joined by transport lines of differing capacities. As such, IP packets may experience processing delays at various nodes as they traverse the Internet matrix from one end-point to the next. Path differences can also lead to variations in arrival times of the IP voice packets, and this phenomenon, exaggerated by network congestion or other conditions, can have an adverse impact on the reconstruction of a voice conversation in real time. Link outages and traffic overload at specific nodes can also lead to packet losses, with a greater potential for negative impacts on the service. Anomalies in the behavior of the integrated network have therefore had limiting effects on the quality of IP voice applications.

To address those problems, standards bodies have improved protocol specifications, allowing greater predictability of the quality of service that a given application might support. However, beyond these protocol specifications, it is necessary to develop tools that are effective in defining and gauging service quality. For example, it would be desirable to provide a basis for raising customer acceptance levels, thus leading to the levels of confidence that are required for mass deployment.

VoIP is a real-time conversational application, and in any one direction, the associated IP packet flow may be described as a real-time isochronous media stream. To maintain quality and media coherency in isochronous applications, strict time dependencies between the application bits must be observed within the destination end-system. The objective metrics that are generally used to describe the packet transport characteristics between two end-points within the Internet are delay, delay variation (also referred to as jitter), and packet loss. Delay refers to the time required to transmit an IP packet between two end-points within the Internet. Causes of delay include processing operations at routers within the network, increases in traffic load on the network side, and coding and packetization processing on the terminal side. Jitter refers to variations in the packet inter-arrival times from one end-system application to the next. Jitter is caused by fluctuations in network load, and differences in path routing of individual packets. Packet loss may refer either to arrivals that are so late as to render the packets unusable, or to the actual loss of packets. Packet loss is caused by network congestion, such as overloading at routers.

It is important to be able to control those end-to-end transport metrics to achieve quality VoIP. The capability to assess the state of those metrics also directly leads to the capability to set and predict the quality of service (QoS) that is supportable between two end-points within the Internet.

Much complexity is involved in quantifying the relationship between the raw end-to-end packet transport metrics and the perceived voice quality for a sample instantiation of IP voice. One viable approach to applying those transport metrics in determining VoIP QoS is a translation to Mean Opinion Scores (MOS) through the use of the E-Model. The E-Model is described in detail in ITU-T Recommendation G.107, "The E-Model, a Computational Model for Use in Transmission Planning" (December 1998), the contents of which is incorporated by reference herein in its entirety. MOS modeling has been in use for several years, and provides a psychological measure of voice quality. MOS scores are derived from the arithmetic average of a group of subjective responses. The technique is widely adopted for voice quality assessment. The E-Model is an analytic model of voice quality for use in network planning purposes. The E-Model provides a method for estimating the relative voice quality when comparing two reference connections. A highlight of the E-Model is the computation of the R-factor, which is used as a measure of voice quality. Once the R-factor is computed, the E-Model allows for straightforward mapping back to MOS scores. The R-factor itself is computed by methods using the network transport metrics as discussed in Cole, R. G. and Rosenbluth, J. H., "Voice over IP Performance Monitoring," Computer Communication Review, V. 31, No. 2 at 9-14 (April 2001), the contents of which is incorporated by reference herein in its entirety.

The most common prior approach to prediction of QOS in the Internet involved the use of injecting echo probes into the network, and using the responses (or lack thereof) to those probes to measure the loss and round trip time (RTT). The RTT may then be used as a basis for estimating delay and jitter. The one-way delay is taken as one-half the measured RTT. That technique does not support in-service VoIP assessment and provisioning. Furthermore, the technique of injecting echo probes derives its metric information through the interface to routers in the network, and is therefore not amenable to implementation within the end-system or to integration with a VoIP application.

It is therefore desirable to provide a method and system for evaluating a quality of service (QoS) level for a communications service through measurement of the network transport metrics available at the end-system, and for modifying parameters to achieve a QoS level based on customer requirements.

SUMMARY OF THE INVENTION

The present invention addresses those needs by providing a method for evaluating a quality of service (QoS) level for a communications service provided over a packetized network, and modifying parameters of that service to achieve the QoS level.

One embodiment of the invention is a method for controlling a communications terminal communicating over a packetized network. A module performing the method receives a quality of service requirement for the service, and at least one transport metric describing characteristics of the network. Based on those parameters, the module determines control information for use by a play-out adaptation routine. The control information is then transmitted to the play-out adaptation routine.

In that method, the step of receiving a quality of service requirement for the service may comprise receiving an attribute of acceptable packet loss. The step of receiving at least one transport metric describing characteristics of the network may comprise receiving at least one of the attributes of a group consisting of packet delay, jitter and packet loss.

The method may also include the step of receiving an error concealment algorithm. The algorithm may be based on a speech coder used in the communications terminal.

The step of determining control information may include estimating a packet loss distribution of the network. To estimate packet loss distribution of the network, the module may measure actual packet loss. The estimation of packet loss distribution may also include adapting parameters of a Pareto distribution.

The step of determining control information may include determining a play-out delay for use by the play-out adaptation routine. The play-out delay d may be defined:

$$d = F^{-1}(T)$$

wherein the function $F^{-1}(\ )$ is an inverse of a function defining a Pareto distribution characterizing packet delays in the network, and T is a target rate of packet accumulation required by the play-out adaptation routine to achieve the quality of service requirement. The function defining a Pareto distribution characterizing packet delays in the network may be:

$$F(x) = 1 - \left(\frac{k}{x}\right)^\alpha, x \geq k$$

wherein estimates are used for the values of k and $\alpha$:

$$\hat{k} = \min(x_1, x_2, x_3, \ldots, x_n)$$

and $$\hat{\alpha} = n \left[\sum_{i=1}^{n} \log\left(\frac{x_i}{\hat{k}}\right)\right]^{-1}$$

where n is a total number of actual packet delay measurements and $(x_1, x_2, x_3, \ldots x_n)$ are actual packet delay measurements.

Further, the target rate T of packet accumulation required by the play-out adaptation routine to achieve the quality of service requirement may be defined as:

$$T = 1 - e_{playout}$$

wherein $$e_{playout} = \frac{e_{mos} - e_{network}}{1 - e_{network}};$$

$e_{mos}$ being a packet loss probability associated with the quality of service requirement, and $e_{network}$ being a packet loss probability of the network.

Another aspect of the invention is an audio terminal for use in communication over a packetized network. The terminal includes a packetizer for extracting incoming audio data from packets received from the network, a play-out adapter for modulating a flow of audio data from the packetizer, and a quality of service engine between the play-out adapter and the packetizer. The quality of service engine is configured to control the modulation of audio data by the play-out adapter based on transport metrics of both the packetizer and the network.

The transport metrics may include at least one metric from the group consisting of average packet delay, packet delay variation and packet loss.

The audio terminal may further comprise a quality of service analysis routine configured to receive the transport metrics from the quality of service engine, and to transmit play-out control information to the quality of service engine. The quality of service analysis routine may further be configured to receive a quality of service requirement from a network API, and to transmit to a network API an achievable quality of service level. The play-out control information may include a play-out delay.

The quality of service engine may control the modulation of audio data by the play-out adapter based on a packet loss probability $e_{playout}$ of the play-out routine determined by $$e_{playout} = \frac{e_{mos} - e_{network}}{1 - e_{network}}$$

wherein $e_{mos}$ is a required maximum packet loss probability and $e_{network}$ is the packet loss probability based on transport metrics of both the packetizer and the network.

The audio terminal may also include an audio controller for encoding and decoding audio data exchanged with the play-out adapter; and a DTX engine for preparing audio data exchanged with the audio control for discontinuous transmission. The DTX engine interfaces with the quality of service engine to coordinate the modulation of audio data.

These and other advantages of the invention will be apparent to those of ordinary skill in the art by reference to the following detailed description and the accompanying drawings.

BRIEF DESCRIPTION OF THE DRAWINGS

FIG. 5 is a block diagram depicting one method according to the invention.

FIG. 6 is a table showing an exemplary mapping of R-factors to MOS values.

FIG. 7 is a table showing exemplary estimated encoding delays for various CODECs.

DETAILED DESCRIPTION

Figure 1:
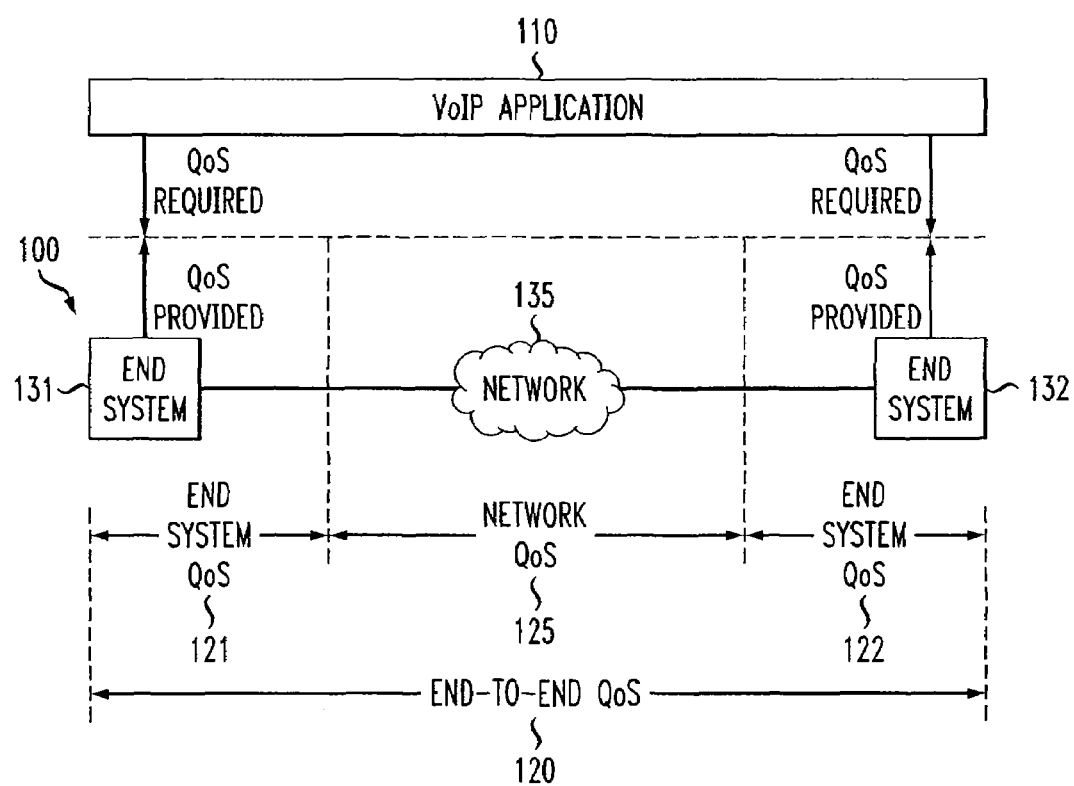
FIG. 1 is a schematic view of an integrated network showing quality of service requirements distribution.

Referring to FIG. 1, a construct is shown in which quality-of-service requirements are distributed across the various segments of an integrated network 100. A VoIP application 110 may require a specific end-to-end service quality 120 that might be resolved into three components 121, 122, 125 that may be individually applied to the network 135 and two end-systems 131, 132. Without the capability to control and assess the transport performance of the integrated network 100, there are likely to be differences in the quality-of-service requested by the application, and that which is provided by the integrated network. In the method and apparatus of the invention, the routines for QoS definition and assessment are integrated within the end systems 131, 132, and provide greater fidelity relative to the underlying end-to-end QoS 120 that is available to the VoIP application.

Figure 2:
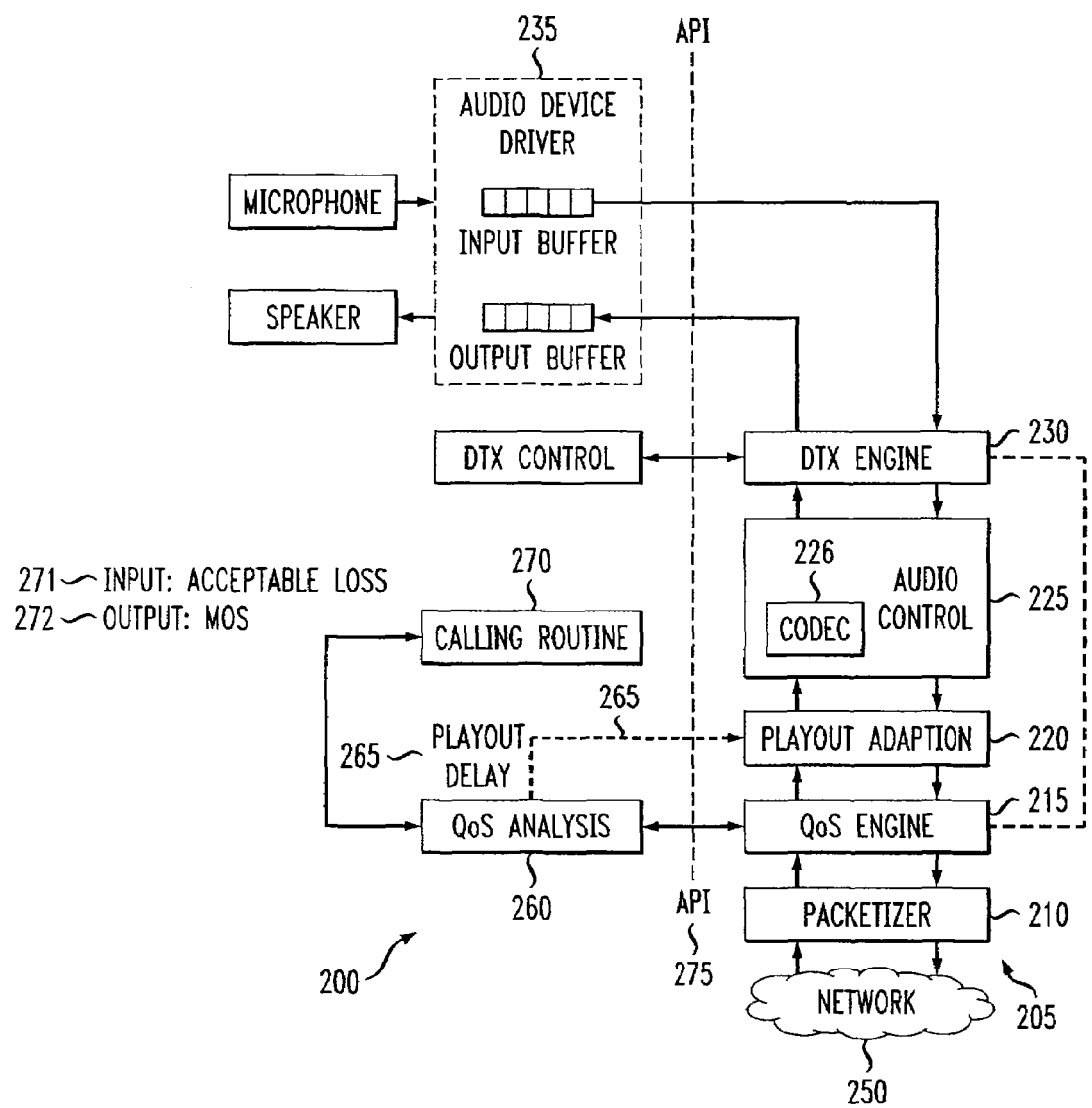
FIG. 2 is a schematic view of a communications terminal according to one embodiment of the invention.

FIG. 2 is a diagram showing a generalized IP voice terminal 200 in which a preferred embodiment of the QoS technique of the invention is incorporated. IP voice terminal software components 205 include a packetizer 210, a QoS engine 215, a play-out adaptation routine 220, an audio control 225 and a DTX (discontinuous transmission) engine 230. The IP voice terminal 200 interfaces with an IP network 250 through the packetizer 210, which is an integral functionality of the terminal. Within the packetizer 210, in the direction toward the network, audio frames are encapsulated in packets for transmission using the real-time transport protocol (RTP). In the direction away from the network 250, the packetizer 210 prepares packets received from the network for processing by the terminal.

The size of the audio packets sent to the network 250 has a direct impact on bandwidth utilization and the processing load within the packetizer 210. Variations in the behavior of the packetizer can therefore affect the measured QoS. In order to account for that component of QoS, the QoS engine 215 is placed between the play-out adapter 220 and the packetizer 210. Such a placement has the result of capturing the effects of packet delays within the network together with the effects of the behaviour of the packetizer, offering a more precise measure of the end-to-end performance afforded by the overall system.

The QoS engine 215 measures transport metrics such as average delay, delay variation and packet loss. The QoS engine may work in conjunction with DTX.

Figure 3:
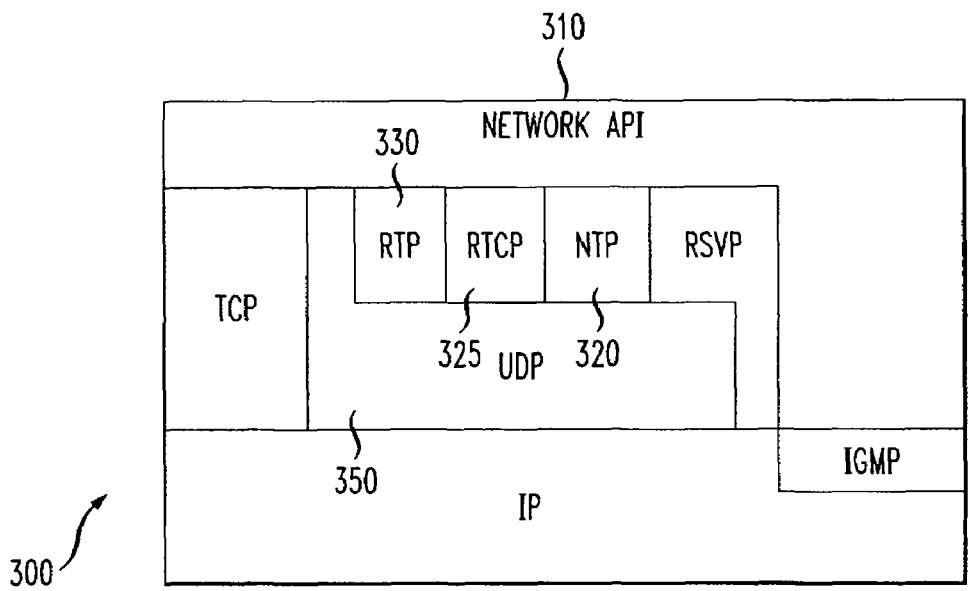
FIG. 3 shows a generalized protocol architecture for IP-based communications.

The QoS engine 275 and DTX engine 230 are utilized through the use of an application programmer interface (API). FIG. 3 shows a generalized protocol architecture 300 for IP-based communications according to the invention. As shown in FIG. 3, the network API interfaces with IP with reference to Network Time Protocol (NTP) 320, Real-Time Transport Protocol (RTP) 330 and the Real-Time Control Protocol (RTCP) 325. The architecture is an integrated services architecture available to the IP voice terminal for audio communications across the Internet. The RTP, RTCP and NTP protocols are utilized between the network API 310 and the Internet, through UDP/IP (Universal Datagram Protocol/Internet Protocol) 350. NTP 320 specifies a procedure for time synchronization, relative to national standard time within the Internet, through the use of distributed servers that operate in a self-organizing mode. RTP 330 is a transport protocol for real-time packet traffic. A relevant feature of RTP is the inclusion of time stamps for use in media synchronization. RTCP 325 is used for media flow control.

Figure 4:
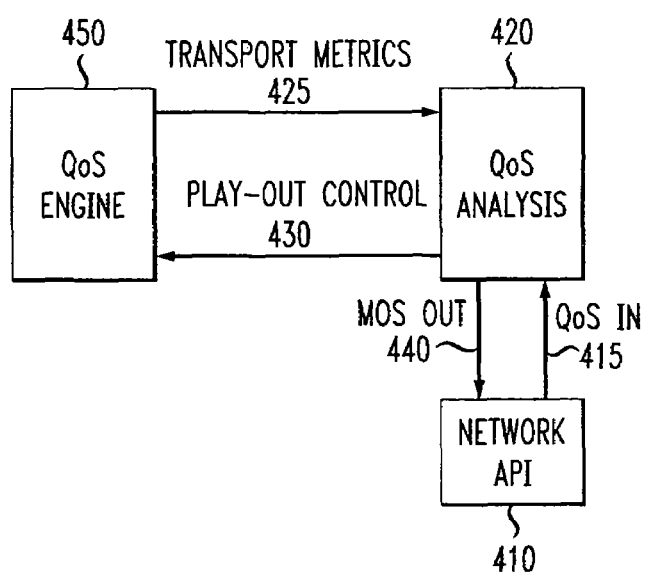
FIG. 4 is a partial schematic view of parameter flow in a communications terminal according to the invention.

FIG. 4 shows data exchanged among the various components of one embodiment of the invention. A specific QoS requirement 415 may be input into the application through the network API 410 by a user. That input 415 is directed to the QoS analysis routine 420. The QoS analysis routine also takes as input the transport metrics 425 that are derived from the computations in the QoS engine 450. Based on those data, the appropriate control information 430 is sent back to the QoS engine to be passed on to the play-out adaptation routine. The QoS analysis routine 420 also sends attainable MOS scores 440 back to the Network API for transmittal to the calling routine/user.

In one example, shown in FIG. 2, an acceptable loss 271 is input to the QoS analysis routine 260 using a calling routine 270. The QoS analysis routine 260 generates play-out delay information 265 using transport metrics from the QoS Engine 215, and sends the play-out delay information to the play-out adaptation routine 220. The play-out adaptation routine uses the play-out delay data to adjust buffering. The achievable MOS 272 is a return parameter to the calling routine 270. In the QoS analysis routine, the transport metrics received from the QoS engine may include the delay, jitter, and loss parameters. Those parameters are mapped to MOS scores through the use of the R-factor mapping function. The MOS scores are then returned to a higher level calling routine 270.

The play-out adaptation routine 220 forwards buffered audio data to the audio control module 225. The audio control module includes a coder/decoder (CODEC) 226 that contains specific algorithms for performing compression and encryption according to the schemes in use by the IP telephony system. As is known in the art, the terminal also includes a discontinuous transmission (DTX) module that suspends transmission during periods of silence, freeing bandwidth for other uses.

A possible input into the QoS analysis routine 260 is an error concealment algorithm. The specific algorithm used depends on the type of CODEC 226 used in the application. The error concealment scheme is designed to improve the performance of the application based on the packet loss distribution within the network.

A method according to the invention is shown in FIG. 5. The method 500 is preferably executed by a QoS analysis module that controls a communications service over a packetized network. A quality of service requirement for the communications service is first received (step 505) by the terminal. As noted above, the QoS requirement may be an attribute of acceptable packet loss, such as a desired MOS input by a user. The QoS requirement is preferably input into the QoS analysis module using a calling routine.

The module also receives (step 510) at least one transport metric describing characteristics of the network. The transport metric is measured using NTP, RTP and/or RTCP. It may be average delay, delay variation, packet loss, or any combination of those metrics or any other metrics that reflect characteristics affecting performance of the network.

Once those values are received, the module determines (step 520) control information for use by a play-out adaptation routine. That control information is based on the quality of service requirement and on the transport metric or metrics. In a preferred embodiment, that control information includes a play-out delay. The determination of the control information is described in more detail below.

The control information is subsequently transmitted (step 530) to the play-out adaptation routine, either directly or through the QoS engine.

A key functionality of the QoS analysis routine 260 (FIG. 2) is the estimation of packet loss distribution for use both in definition and control of the quality of service. In an illustrative embodiment, the loss distribution is computed by first computing running measurements of packet losses and delays within the network, using RTP in the terminal. The delay information is then used to estimate the parameters of a generalized function that characterizes the delay distribution in the network. In a preferred embodiment, the delay distribution is represented by a Pareto distribution. The parameters of the Pareto distribution are adapted to changes in traffic loads, so that time-of-day variations may be incorporated. Network losses are recorded for further use.

A specific QoS is realized by allocating loss during play-out The allocation depends on both the loss in the network and that which has been scheduled in the play-out adaptation routine. The combined loss in the network and in the play-out adaptation routine is referred to hereinafter as "overall loss." The loss that is allowed in the play-out routine is "residual loss," beyond that which has occurred in the network, and will be allocated based on the use of the Pareto distribution.

In accordance with the present invention, let a given MOS be specified by a user through the calling routine. Let the associated packet loss probability be given by $e_{mos}$. $e_{mos}$ shall be the acceptable loss probability for the particular application. In the QoS engine, sample delays will be measured through the use of RTP, over some specified interval I, whereby N such measurements are collected. A loss probability for the network, $e_{network}$, is computed in the QoS engine. The acceptable residual loss that must be allowed in the play-out routine to support the specified MOS is given by $r=e_{mos}-e_{network}$. Of course, if the loss in the network is greater than what is established by the QoS requirement, then the specified quality of service would not be supported. The acceptable loss probability, $e_{playout}$, that may be allowed in the play-out routine is then given by:

$$e_{playout} = \frac{e_{mos} - e_{network}}{1 - e_{network}}$$

The Pareto distribution is described by the following equation:

$$F(x) = 1 - \left(\frac{k}{x}\right)^\alpha, x \geq k$$

where estimates of the parameters k and α are given by:

$$\hat{k} = \min(x_1, x_2, x_3, \ldots, x_n)$$

and, $$\hat{\alpha} = n\left[\sum_{i=1}^{n} \log\left(\frac{x_i}{\hat{k}}\right)\right]^{-1}$$

In the play-out adaptation procedure, play-out delay is adaptively set to ensure that the residual loss for a given QoS is achieved. The play-out delay may be tied to the required MOS as follows: The target rate of packet accumulation that is needed by the speech play-out process to achieve the required MOS, given the losses that have occurred in network, is given by:

$$T = 1 - e_{playout}$$

The play-out delay, d, required to achieve this QoS is then computed as:

$$d = F^{-1}(T)$$

where $F^{-1}()$ is the inverse of $F()$ defined above.

Within the QoS analysis block, the network transport metrics computed in the QoS engine are mapped to MOS scores for perceptual comparison with well-known circuit-switched implementations. The mapping procedure is facilitated with CODEC-specific information, and use is made of the E-model. When using the E-model, it is necessary to first compute an R-factor using the network transport metrics. The R-factor is then mapped to MOS values through the use of the information represented in the table of FIG. 6.

The general equation for the R-factor is defined by:

$$R = 100 - I_s - I_d - I_{ef} + A$$

wherein $I_s$, $I_d$, and $I_{ef}$ are used to denote the impairments associated with the signal-to-noise ratio, network delay, and packet losses respectively. The parameter A is a normalization factor. For a specific application, the R-factor may be reduced to:

$$R = \beta - I_d - I_{ef}$$

wherein β, the reduction factor, may be fixed for pure packet-switched networks, or networks involving a combination of both packet-switched and circuit-switched networks. In one embodiment of the present invention in which default parameters are assigned values consistent with those described in ITU-T Recommendation G.107, β takes on a value of 94.2.

An analytic expression for the delay impairment, $I_d$, is given in ITU-T Recommendation G.107. However, invoking the assumption of an all IP environment, and applying default parameters as provided by the Recommendation, that expression may illustratively be reduced to:

$$I_d = 0.024d + 0.11(d - 177.3)H(d - 177.3)$$

wherein d is the one-way delay as defined by:

$$d = d_{codec} + d_{playout} + d_{network}$$

and the function H(x) is defined as:

$$H(x) = \begin{cases} 0, \text{ for } x < 0, \\ 1, \text{ for } x > 0 \end{cases}$$

$d_{codec}$ in the above definition of d is a processing delay associated with the specific speech coder in use in the application. That delay characterizes the encoding, compression, and packetization processes. Examples of the CODEC-specific delays for two common CODECs are illustrated in FIG. 7, wherein N is the number of 10 millisecond frames that are packetized in a single IP frame.

The expression for $I_{ef}$, the impairment associated with packet loss, is normally determined from MOS characterization of the available CODECs under various operating conditions. Given a number of sample data points, a curve fitting procedure is conducted to determine the parameters, $\gamma_1 \ldots \gamma_i$, of the following curve:

$$I_{ef} = \gamma_1 + \gamma_2 \ln(1 + \gamma_3 e)$$

where e is the total loss probability, and is given by:

$$e = e_{network} + (1 - e_{network})e_{playout}$$

The fitting parameters, $\gamma_i$, are CODEC-specific. As an illustration, for a G.729a CODEC with a packet size of 20 ms, and random packet loss of up to 16%, $I_{ef}$ is given by:

$$I_{ef} = 11 + 40 \ln(1 + 10e)$$

Using the reduced definition of the R-factor presented herein allows the development of a numerical expression for R that can be mapped to an MOS value by the application of the information presented in the table of FIG. 6.

In accordance with the present invention, the proposed technique can be implemented in a number of areas. For example, the technique of the invention may be used for service characterization, whereby a terminal having the described functionality is deployed in a specific location and used to communicate with similar terminals to characterize the VoIP QoS. In another example, the inventive technique may be used for fault management in situations where network problems exist, and the sources of those problems are to be localized.

Further, the method of the invention may be used for baseline monitoring in which, after enhanced QoS policies are applied, the technique is used to ensure that such enhancements are available. The technique may also be used for performance monitoring in cases, for example, where a service level agreement (SLA) is in place.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

The invention claimed is:

1. A method for controlling a communications terminal communicating audio data over a network, comprising:
   receiving, by a device, a quality of service requirement for a service, wherein the receiving the quality of service requirement for the service comprises receiving an attribute of acceptable packet loss;
   receiving, by the device, a transport metric describing a characteristic of the network;
   determining, by the device, control information for use by a play-out adaptation routine, the control information being based on the quality of service requirement and on the transport metric; and
   transmitting, by the device, the control information to the play-out adaptation routine to adapt the audio data in accordance with the control information.

2. The method of claim 1, wherein the receiving the transport metric describing the characteristic of the network comprises receiving a packet delay attribute.

3. The method of claim 1, wherein the determining control information comprises determining a play-out delay for use by the play-out adaptation routine.

4. The method of claim 1, wherein the receiving the transport metric describing the characteristic of the network comprises receiving a jitter attribute.

5. The method of claim 1, wherein the receiving the transport metric describing the characteristic of the network comprises receiving a packet loss attribute.

6. An audio terminal for use in communication over a network, comprising:
   a packetizer for extracting incoming audio data from packets received from the network;
   a play-out adapter for modulating a flow of audio data from the packetizer; and
   a quality of service engine between the play-out adapter and the packetizer, the quality of service engine for controlling a modulation of audio data by the play-out adapter based on transport metrics of both the packetizer and the network.

7. The audio terminal of claim 6, wherein the transport metrics comprise an average packet delay metric.

8. The audio terminal of claim 6, further comprising:
   a quality of service analysis module configured to receive the transport metrics from the quality of service engine, and to transmit play-out control information to the quality of service engine.

9. The audio terminal of claim 8, wherein the play-out control information comprises a play-out delay.

10. The audio terminal of claim 6, further comprising:
    an audio controller for encoding and decoding audio data exchanged with the play-out adapter; and
    a discontinuous transmission engine for preparing audio data exchanged with the audio controller for discontinuous transmission, where the discontinuous transmission engine is further for interfacing with the quality of service engine to coordinate the modulation of audio data.

11. The audio terminal of claim 6, wherein the transport metrics comprise a packet delay variation metric.

12. The audio terminal of claim 6, wherein the transport metrics comprise a packet loss metric.

13. An apparatus for controlling a communications terminal communicating audio data over a network, comprising:
    a device for receiving a quality of service requirement for a service, wherein the receiving the quality of service requirement for the service comprises receiving an attribute of acceptable packet loss, for receiving a transport metric describing characteristics of the network, for determining control information for use by a play-out adaptation routine, the control information being based on the quality of service requirement and on the transport metric, and for transmitting the control information to the play-out adaptation routine to adapt the audio data in accordance with the control information.

14. The apparatus of claim 13, wherein the device is further for receiving a packet delay attribute.

15. The apparatus of claim 13, wherein the determining the control information comprises determining a play-out delay for use by the play-out adaptation routine.

16. The apparatus of claim 13, wherein the receiving the quality of service requirement comprises receives a jitter attribute.

17. The apparatus of claim 13, wherein the receiving the transport metric comprises receiving a packet loss attribute.

* * * * *